Figure 1:
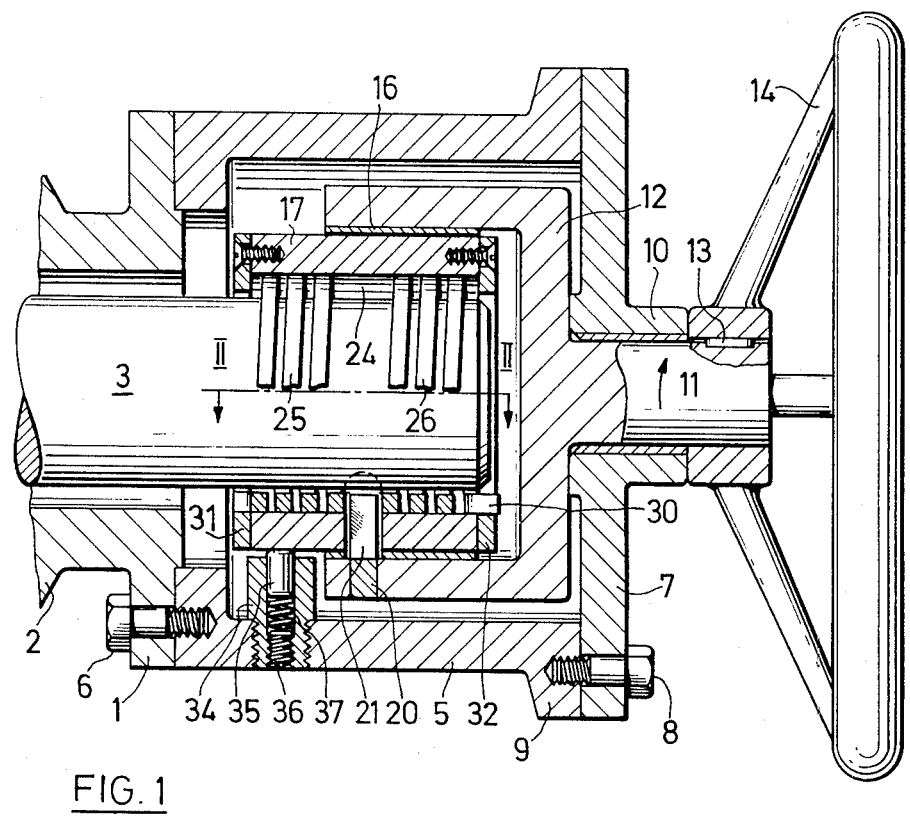

United States Patent [19]

Brunner

[11] 4,257,500
[45] Mar. 24, 1981

[54] HAND DRIVE FOR COUPLING TO A ROTATABLE SHAFT

[75] Inventor: Alfred Brunner, Winterthur, Switzerland

[73] Assignee: Sulzer Brothers Limited, Winterthur, Switzerland

[21] Appl. No.: 35,282

[22] Filed: May 2, 1979

[30] Foreign Application Priority Data

May 12, 1978 [CH] Switzerland ............... 5180/78

[51] Int. Cl.³ .............. F16D 13/12; F16D 67/00; F16D 47/04
[52] U.S. Cl. .................. 192/35; 192/48.92; 192/51; 192/81 C; 192/95
[58] Field of Search ........... 192/48.92, 12 BA, 8 C, 192/35, 51, 36, 81 C, 95

[56] References Cited

U.S. PATENT DOCUMENTS

| | | |
|---|---|---|
| 1,935,684 | 10/1933 | Wemp ................................. 192/35 |
| 3,193,066 | 7/1965 | Tomko ............................... 192/8 C |
| 3,319,752 | 5/1967 | Chillson et al. ................... 192/51 |
| 3,539,042 | 11/1970 | Sacchini ......................... 192/36 X |
| 3,618,721 | 10/1971 | Hare ................................. 192/36 |
| 3,648,810 | 3/1972 | Weatherby ....................... 192/36 |
| 3,837,450 | 9/1974 | Malion et al. ................. 192/12 BA |

Primary Examiner—George H. Krizmanich
Attorney, Agent, or Firm—Kenyon & Kenyon

[57] ABSTRACT

The hand drive employs two coil springs between the sleeve of the coupling and the shaft to be turned. The hand wheel has a driver with a parallelepiped extension for abutting one or the other of the facing spring ends depending on the direction of rotation of the hand wheel. A brake is also used to restrain movement of the sleeve and limit the torque exerted on the sleeve by the hand wheel.

6 Claims, 2 Drawing Figures

HAND DRIVE FOR COUPLING TO A ROTATABLE SHAFT

This invention relates to a hand drive for coupling to a rotatable shaft.

As is known, various types of machines are known wherein a hand drive can be coupled to a rotatable shaft for manual turning of the shaft. For example, one known hand drive, as described in U.S. patent application Ser. No. 920,287, filed June 29, 1978, utilizes a sleeve which can be placed around a shaft, a coil spring which is disposed within the sleeve in spaced relation to the shaft and with the spring convolutions in biassed contact with the sleeve, and a hand wheel which is able to rotate one end of the spring in such a manner that at least the spring convolutions adjacent this end are brought into contact with the shaft to enable the hand wheel to turn the shaft. In this construction, the sleeve is inhibited from rotating further, at the latest, after a brief starting motion of the hand wheel. This solution leads to a functionally reliable but relatively expensive construction with transmissions. Such constructions are, however, justified if a transmission between the shaft and the hand drive is required.

Accordingly, it is an object of the invention to provide a hand drive of simple construction which can be coupled to a rotatable shaft.

It is another object of the invention to provide a hand drive which is reliable in operation.

It is another object of the invention to provide a hand drive of compact construction provided no transmission is required on the hand drive side.

Briefly, the invention provides a hand drive for coupling with a rotatably driven shaft, such as the shaft of a servomotor. The hand drive includes a hand wheel assembly for manual turning of the shaft and a coupling for coupling the hand wheel assembly onto the shaft. The coupling includes a sleeve which is rotatably disposed in concentric relation about the shaft to define a gap therewith, a pair of coil springs in the gap concentrically between the sleeve and shaft and a driver connected to the hand wheel assembly. Each coil spring has one end secured to the sleeve and has convolutions radially biassed into engagement with the sleeve and spaced from the shaft. The driver passes through a slot in the sleeve in spaced relation to an opposite end of each coil spring from the end secured to the sleeve. The driver is positioned to engage with the opposite end of a respective spring in dependence on the direction of rotation of the hand wheel assembly to cause the spring convolutions near that end to disengage from the sleeve and engage with the shaft to rotate the shaft. In addition, the hand drive has a static brake which abuts the sleeve to restrain rotation of the sleeve relative to the shaft and hand wheel assembly.

The hand drive also has a housing which can be secured to the machine in which the shaft is mounted and which serves to house the sleeve, springs and hand wheel assembly.

One advantage of the above construction is that the hand drive, particularly the housing, may be formed almost exclusively of economically producible bodies of revolution in spite of the small volume.

The hand drive assembly includes a hand wheel, a stub shaft having the wheel secured thereon and a cup-shaped extension on the stub shaft disposed about the sleeve. This provides a simplified construction.

The brake is constructed to be adjustable to limit the torque exerted on the sleeve in such a manner that switching on of the servomotor cannot be prevented by hand. In addition, if the servomotor is running, this feature prevents the motion of the motor from being braked completely by manual intervention.

Figure 2:
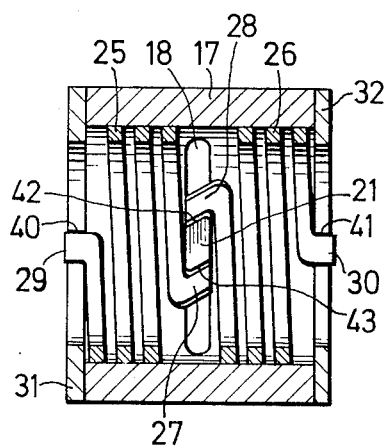

These and other objects and advantages of the invention will become more apparent from the following detailed description taken in conjunction with the accompanying drawings wherein:

FIG. 1 illustrates a cross-sectional view of a hand drive according to the invention coupled to a servomotor shaft; and FIG. 2 illustrates a view taken on line 2—2 of FIG. 1.

Referring to FIG. 1, an electric rotary-positioning motor, e.g. a servomotor, has a flange 1 about an opening of a housing 2 through which a rotatably driven shaft 3 passes. The other end of the shaft 3 acts for example on a valve (not shown) via a suitable transmission.

A hand drive is coupled to the shaft 3 in order to permit manual rotation of the shaft 3 when required. To this end, the hand drive has a housing 5 in the form of a cylinder secured to the flange 1 via screws 6 about the shaft 3 and has a cover 7 secured via screws 8 to a flange 9 of the housing 5 at the end opposite the motor housing 2 to close off the end face. The cover 7, in turn, has a hub 10 for purposes as described below.

The hand drive has a hand wheel assembly rotatably mounted in the housing 5. As shown, this hand drive assembly includes a hand wheel 14, a stub shaft 11 on which the wheel 14 is secured via a kay 13 and a cup-shaped extension 12 on the stub shaft 11. This extension 12 which may also be supported in the housing 5 by a ball bearing (not shown) contains a cylindrical bearing 16 in which a cylindrical sleeve 17 is rotatably supported.

The sleeve 17 is disposed in concentric relation about the shaft 3 to define a gap 24 therewith. In addition, the sleeve 17 has a circumferentially disposed slot 18 which passes radially through the sleeve 17 at about mid-length.

The hand drive also has a driver 20 which is connected to the cylindrical wall of the cup-shaped extension 12 and passes through the slot 18. This driver 20 is in the form of a pin which protrudes radially through the slot 18 into the gap 24 as a parallelepiped 21 with a diamond-shaped base.

In addition, a pair of coil springs 25, 26 are disposed in the gap 24 concentrically between the sleeve 17 and shaft 3. Each spring 25, 26 is wound of square wire in the same sense and has convolutions radially biassed into engagement with the sleeve 17 while being spaced from the shaft 3. The oppositely facing ends 27, 28 of the springs 25, 26 are each offset at an acute angle in such a manner that the offset ends are parallel to two surfaces of the parallelepiped 21. The outer ends 29, 30 of the two coil springs 25, 26 are bent off approximately at right angles so that the resultant free legs are parallel (see FIG. 2) to the axis of the springs 25, 26. Each of these ends 29, 30 are secured to the sleeve 17 by engaging in radial slots 40, 41 arranged in two rings 31, 32 which are secured, as by screws, to the two end faces of the sleeve 17 so as to be moved for adjustment. The adjustment is chosen so that there is a small amount of tangential play 42, 43 between the parallelepiped 21 and the spring ends 27, 28.

The hand drive also has a static brake abutting the sleeve 17 to restrain rotation of the sleeve 17 relative to the shaft 3 and hand wheel assembly. As shown, the brake includes a nipple 34 which is threaded radially into the housing 5 and a brake pin 35 which is positioned in a bore of the nipple 34 and biassed against the sleeve 17 by a worm screw 36 via a spring 37.

In normal operation, the shaft 3 is driven by the mentioned electric rotary-positioning motor (not shown). Since the springs 25, 26 rest against the sleeve 17 with radial pretension (a defined small amount of play being maintained between the springs and the shaft), the shaft 3 rotates without any wear if the positioning motor is switched on. If the motor fails or if the shaft 3 is to be moved otherwise during standstill, the hand wheel 14 is turned manually, for instance, in the direction indicated by the arrow. Then, the driver 20 abuts the end 27 of the spring 25. Since the end 29 of the spring is shackled to the sleeve 17, the spring 25 is drawn away from the sleeve 17 in an inward direction while, at the same time, being wound on the shaft 3. Thereby, the driver 20 exerts a torque on the end of the shaft 3 via the spring 25 which increases with the turning angle of the hand wheel 14, until the shaft end is finally taken along. In the process, the sleeve 17 is now also taken along against the action of the brake pin 35. The spring 25 is then pulled tight on the shaft 3. At the hand drive 14, a torque must therefore be exerted which corresponds to the sum of the drive moment of the shaft 3, of the braking moment exerted by the pin 35 and of the friction in the bearings.

If the springs 25, 26 have few turns, as shown, then the ratio of the torque that can be exerted on the shaft 3 and the braking moment is relatively small; however, it increases with increasing number of turns, i.e., increasing angle of grip.

If, in this condition, the rotary-positioning motor is switched on in the direction of the hand drive and is accelerated to a speed which is higher than the hand-drive speed, then the spring 25 together with the sleeve 17 rotates for a brief instant at the higher speed of the shaft 3, whereby the spring end 27 is detached from the driver 20 and the spring 25 snaps back to the inside wall of the sleeve 17, the transmission of the torque from the shaft 3 to the spring being interrupted.

If in the condition mentioned, the rotary-positioning motor is switched on in a direction opposite that of the hand drive, the end 29 of the spring 25 is supported by the sleeve 17, and the spring 25 is opened by the friction acting on those coils being in contact with the shaft 3. This again makes the spring 25 spring against the wall of the sleeve 17. This springing-back takes place so fast that only an insignificant jolt is felt at the hand wheel 14.

If the hand wheel 14 is driven in the direction opposite that indicated by the arrow in the drawing, then the spring 25 remains at rest with a pretension against the sleeve 17 while the spring 26 is wound up on the shaft 3 by the parallelepiped 21 abutting the spring end 28, until a frictional connection between the spring 26 and the shaft 3 takes place.

The gap 24 between the sleeve 17 and the shaft 3 is to be chosen a certain amount larger than the thickness of the spring 25. This radial excess amount, multiplied by the number of turns times $2\pi$ must be contained in the free path of the driver 20, measured one way, in the slot 8, with additional tangential play.

Through proper choice of the pretension of the spring 37 acting on the brake pin 35, the torque which can be exerted on the shaft 3 by the hand drive, can be limited. The drive can therefore be adjusted so that it is impossible to block the running rotary-positioning motor by hand.

Variants of the embodiments example drawn are conceivable. Thus, the shaft 3 which can be driven by the rotary-positioning motor, can be a hollow shaft, in which the sleeve 17 would be supported on a shaft which is connected to the hand drive and is provided with a driving pin. The springs would then abut the driving pins with straight, not offset ends. The slot 18 is of sufficient circumferential length to permit a spring 25, 26 to be deformed into engagement with the shaft 3 without having the driver 20 reaching and abutting the end of the slot 18.

What is claimed is:

1. In combination with a roatatably driven shaft;
   a hand wheel assembly for manual turning of said shaft;
   a coupling for coupling said hand wheel assembly onto said shaft, said coupling including a sleeve disposed in concentric relation about said shaft and defining a gap with said shaft, a pair of coil springs in said gap concentrically between said sleeve and said shaft, each said spring having one end secured to said sleeve and convolutions radially biased into engagement with said sleeve and spaced from said shaft, and a driver connected to said hand wheel assembly and passing through a slot in said sleeve in spaced relation to an opposite end of each coil spring for engaging with said opposite end of a respective coil spring in dependence on the direction of rotation of said hand wheel assembly to cause said convolutions of said respective spring near said opposite end to disengage from said sleeve and engage with said shaft to rotate said shaft; and
   a static brake abutting said sleeve to restrain rotation of said sleeve relative to said shaft and hand wheel assembly.

2. The combination as set forth in claim wherein said hand wheel assembly includes a hand wheel, a stub shaft having said wheel secured thereon and a cup-shaped extension on said stub shaft disposed about said sleeve.

3. The combination as set forth in claim 1 wherein said brake is adjustable to limit the torque exerted on said sleeve.

4. The combination as set forth in claim 1 wherein said slot is circumferentially disposed about said sleeve.

5. The combination as set forth in claim 1 wherein said brake includes a radially disposed brake pin abutting said sleeve, a spring biassing said pin against said sleeve and a screw for moving said spring relative to said pin.

6. A hand drive for mounting on a rotatable shaft, said drive comprising
   a sleeve for mounting concentrically about a shaft to define an annular gap therebetween;
   a pair of coil springs concentrically within said sleeve, each said spring having one end secured to said sleeve and convolutions radially biassed into engagement with said sleeve;
   a rotatable hand wheel;
   a driver connected to said hand wheel and passing through a slot in said sleeve in spaced relation to an opposite end of each coil spring for engaging with said opposite end of a respective coil spring in dependence on the direction of rotation of said hand wheel assembly to cause said convolutions of said respective spring near said opposite end to disengage from said sleeve and engage with said shaft to rotate said shaft; and a static brake for abutting said sleeve to restrain rotation of said sleeve relative to said shaft and hand wheel assembly.

* * * * *

UNITED STATES PATENT AND TRADEMARK OFFICE
CERTIFICATE OF CORRECTION

PATENT NO. : 4,257,500
DATED : March 24, 1981
INVENTOR(S) : Alfred Brunner

It is certified that error appears in the above—identified patent and that said Letters Patent is hereby corrected as shown below:

Column 2, line 33, change "kay" to --key--

Column 4, line 43, after "claim" insert --1--

Signed and Sealed this

Twenty-third Day of June 1981

[SEAL]

Attest:

RENE D. TEGTMEYER

Attesting Officer   Acting Commissioner of Patents and Trademarks